United States Patent

[11] 3,611,036

| [72] | Inventor | Robert W. Edson<br>Tracy, Calif. |
|---|---|---|
| [21] | Appl. No. | 4,619 |
| [22] | Filed | Jan. 21, 1970 |
| [45] | Patented | Oct. 5, 1971 |
| [73] | Assignee | Occidental Petroleum Corporation<br>Los Angeles, Calif. |

[54] GROUND FAULT DETECTOR FOR ELECTRIC MOTORS
5 Claims, 2 Drawing Figs.

[52] U.S. Cl. .................................................. 317/18 R,
317/23, 317/24, 340/253 R, 340/255
[51] Int. Cl. .................................................. H02h 3/16
[50] Field of Search ........................................ 340/253,
255; 317/18, 124, 23

[56] References Cited
UNITED STATES PATENTS

| 2,428,563 | 10/1947 | Fountain | 317/18 X |
| 2,585,734 | 2/1952 | Bucher | 340/255 |
| 3,136,926 | 6/1964 | Smith | 317/124 X |
| 3,307,076 | 2/1967 | Park | 317/124 X |
| 3,402,326 | 9/1968 | Guasco et al. | 317/124 X |

*Primary Examiner*—William H. Beha, Jr.
*Assistant Examiner*—Harry E. Moose, Jr.
*Attorney*—Christie, Parker & Hale ABSTRACT: There is described a ground-detecting circuit for a motor or other electrical load wherein, before the motor is turned on, two terminals of the motor are connected to two input power lines through diodes in series with neon lamps and current-limiting resistors. A ground in the motor produces a current flow through one or both lamps. A photosensitive resistor, in response to the light from the lamps, activates a relay control circuit to open the input line to the motor, so that the motor cannot be turned on.

INVENTOR.
ROBERT W. EDSON
BY
Christie, Parker & Hale
ATTORNEYS

GROUND FAULT DETECTOR FOR ELECTRIC MOTORS

FIELD OF THE INVENTION

This invention relates to motor protection circuits, and more particularly, is concerned with a ground fault-detector circuit for preventing operation of an electric motor if a ground fault has developed.

BACKGROUND OF THE INVENTION

In electric motors and other types of electrical devices, it is possible for current leakage paths to ground to develop due to breakdown of insulation. Ground faults are particularly apt to develop where the motor is operated in a condition where it is subject to moisture and the elements. To start the motor up when a ground fault has developed may result in burning out of the motor winding or produce a dangerous operating condition.

SUMMARY OF THE INVENTION

While various devices are available for measuring leakage to ground in electrical devices, the present invention provides a very simple, inexpensive ground fault detector which indicates a ground condition whenever the load is disconnected from the line and provides a simple lockout circuit, preventing the load from being connected to the line when a ground fault develops.

In brief, the ground fault detector of the present invention operates by connecting a light and diode in series between two of the line terminals and two terminals of the load. The diodes are polarized in opposite directions so as to prevent any direct current flow through the load. However, if a ground develops in the load, one or both diodes conduct causing the associated lamps to light. A relay control circuit operated by a photosensitive resistor prevents a circuit being completed directly between the line and the load when either of the lamps is turned on.

BRIEF DESCRIPTION OF THE DRAWINGS

For a more complete understanding of the invention, reference should be made to the accompanying drawing wherein.

DETAILED DESCRIPTION

Figure 1:
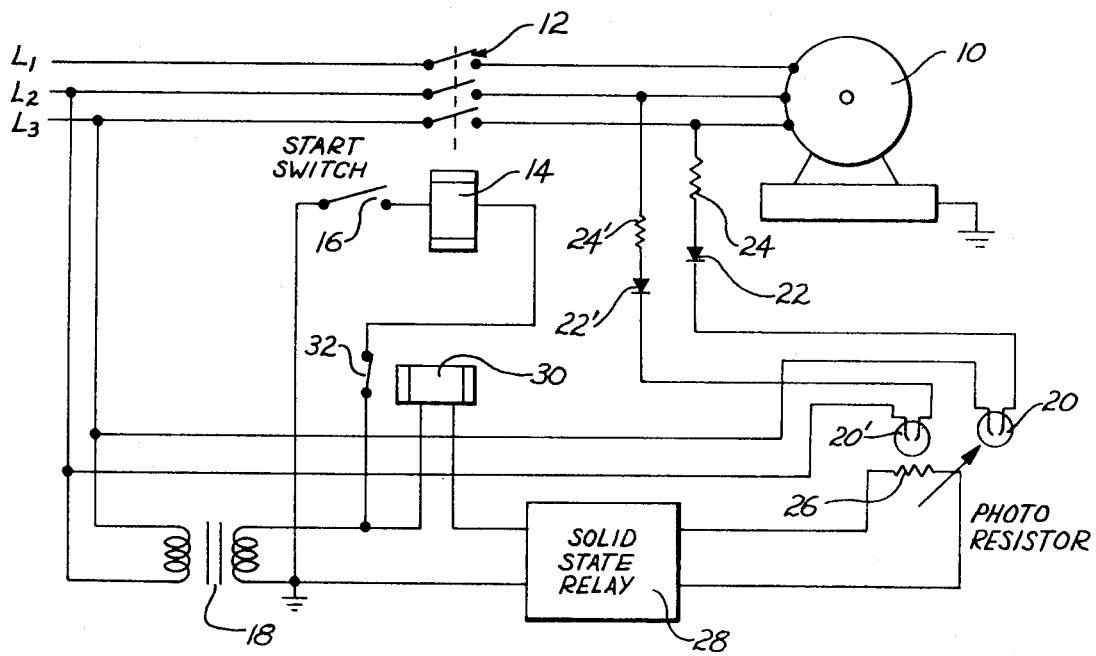
FIG. 1 is a schematic diagram of one embodiment of the invention associated with a three-phase motor.

Referring to FIG. 1 in detail, the numeral 10 indicates generally an electrical load such as a three-phase electrical motor which can be connected to a three-phase electrical source (not shown) over three lines, designated $L_1$, $L_2$, and $L_3$. Power is applied to the motor 10 through a three-pole relay-operated switch 12, having a relay coil 14. A start switch 16, when closed connects the relay coil 14 across the secondary of a transformer 18, the primary of which is connected across two of the power lines. The transformer 18 is provided as a voltage stepdown transformer where the relay coil 14 operates at a lower voltage than the line voltage to the motor.

The ground fault-detector circuit includes two identical series circuits, each of which includes a neon lamp, indicated at 20 and 20', a diode, indicated at 22 and 22', and a current-limiting resistor, indicated at 24 and 24'. Each of the series circuits shunts one of the poles of the switch 12. Thus when the motor 10 is turned off and the switch 12 is open, the two series circuits connect two terminals of the motor 10 to two of the input lines. The two diodes 22 and 22' provide low resistance to flow of current in only one direction relative to the load. By connecting the two diodes such that they provide low resistance to current flow in opposite directions through the load, the diodes, prevent flow of current in either direction from one line through the motor winding 10 to the other line. However, if a current path to ground develops in the motor 10, a half-wave rectified current is passed by one of the series circuits between the input line terminals and ground, causing one or both lamps 20 and 20' to light.

Normally one of the three input power lines is at ground potential. If line $L_1$, for example, is the grounded line of the power source, then a ground developing in the motor 10 causes both lamps 20 and 20' to light. If either of the lines $L_2$ or $L_3$ is the grounded line, then of course no current flows in the grounded line due to a ground in the motor 10, and so the lamp in the associated series circuit does not light, but the other lamp does light. Thus it is immaterial to the operation of the ground detector which of the three power lines from the source might be grounded.

A safety interlock arrangement is provided by means of a photoresistor 26 which senses when one of the lamps 20 or 20' is lit. The photoresistor 26 operates a sensitive solid-state relay unit 28. The relay unit 28, when actuated, completes a circuit from the secondary of the transformer 18 through the coil 30 of a relay switch 32. The relay switch 32 is a normally closed switch which is in series with the circuit operating the coil 14 of the relay switch 12. By this arrangement, if one of the lamps 20 or 20' is lit, the photoresistor 26 activates the solid-state relay 28, energizing the relay 30 and opening the starting circuit to the relay coil 14. Thus as long as one of the lamps remains lit, it is impossible to start the motor 10. This insures that when a ground fault develops in the motor, the motor cannot be damaged by the application of electrical power to the motor.

It should be noted that in the circuit, as described, only a single series circuit is required if the circuit is always wired to an ungrounded line from the power source. By providing two such series circuits shunting the poles of the power switch, it of course is immaterial which line of the power source is grounded.

Figure 2:
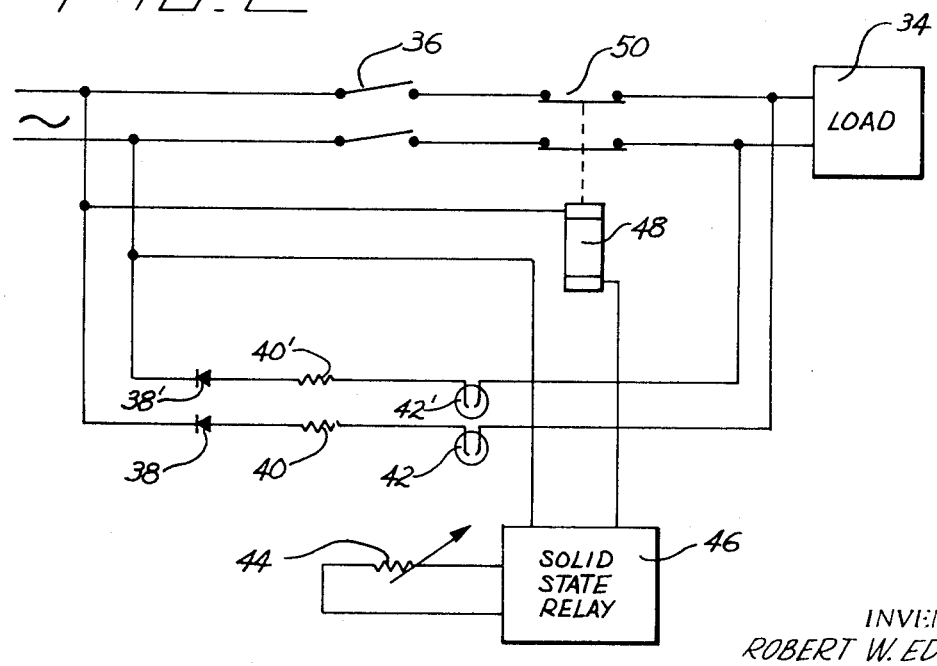
FIG. 2 is a schematic diagram of the modified circuit of the present invention for use with a single phase load.

FIG. 2 shows an application of the ground detector circuit to a single-phase load. In this case the two input terminals of an electrical load 34 are connected to a single-phase power source through a double-pole manually operated switch 36. The two poles are respectively shunted by a series circuit including a diode 38, resistor 40, and lamp 42. Operation is substantially as described in connection with FIG. 1 in that the two series circuits permit operation of the ground detector regardless of which of the terminals of the power source is grounded.

The safety lockout arrangement includes a photoresistor 44 which operates a solid-state relay 46, which in turn activates the coil 48 of a two-pole relay switch 50. The relay switch 50 is normally closed. However, when either of the lamps 42 or 42' is lit, the photoresistor 44 causes the relay coil 48 to be energized, opening the connections to the input terminals of the load 34.

What is claimed is:

1. A ground fault detector circuit for indicating a grounded condition of an electrical load device adapted to be operated from an alternating current source, said circuit comprising switch means for connecting the source to the load, first and second series circuits connecting two terminals of the source respectively to two terminals of the load and shunting the switch means, each series circuit including a rectifier and a current indicating element, the two rectifiers being connected to provide minimum resistance to current flow in opposite directions relative to each other to normally block current flow in either direction through the load device from the source when the switch means is open.

2. Apparatus as defined in claim 1 wherein the indicating element in each series circuit comprises a light-emitting unit.

3. Apparatus as defined in claim 1 further including switch means for connecting the two terminals of the load device directly to the two terminals of the source for operating the load, and means responsive to said current indicating elements when a current is passing through either element for preventing the switch means from completing a connection between the load and the source.

4. Apparatus as defined in claim 2 further including means responsive to said current-indicating elements when a current is passing through either element for preventing the switch means from completing a connection between the load and the source.

5. Apparatus as defined in claim 4 wherein the means responsive to the current-indicating elements includes a photosensitive element, and relay means operated by said element for completing a circuit between the load device and the source only when the light-emitting units are not emitting light.